US012440849B2

(12) United States Patent
Humphreys et al.

(10) Patent No.: US 12,440,849 B2
(45) Date of Patent: Oct. 14, 2025

(54) ARTICULABLE-ARM-MOUNTABLE PULVERISATION APPARATUS AND METHOD OF USE THEREOF

(71) Applicant: Auger Torque Europe Limited, Cheltenham (GB)

(72) Inventors: Nick Humphreys, Gloucestershire (GB); William Oughton, Gloucestershire (GB)

(73) Assignee: Auger Torque Europe Limited, Cheltenham (GB)

( * ) Notice: Subject to any disclaimer, the term of this patent is extended or adjusted under 35 U.S.C. 154(b) by 347 days.

(21) Appl. No.: 18/256,078

(22) PCT Filed: Dec. 9, 2021

(86) PCT No.: PCT/GB2021/053225
§ 371 (c)(1),
(2) Date: Jun. 6, 2023

(87) PCT Pub. No.: WO2022/123252
PCT Pub. Date: Jun. 16, 2022

(65) Prior Publication Data
US 2024/0017266 A1 Jan. 18, 2024

(30) Foreign Application Priority Data
Dec. 10, 2020 (GB) .................................... 2019458

(51) Int. Cl.
*B02C 2/00* (2006.01)
*E02F 3/96* (2006.01)

(52) U.S. Cl.
CPC ................ *B02C 2/00* (2013.01); *E02F 3/965* (2013.01)

(58) Field of Classification Search
CPC ..... B02C 2/00; B02C 2/02; B02C 2/04; E02F 3/965; E02F 7/06
See application file for complete search history.

(56) References Cited

U.S. PATENT DOCUMENTS 6,499,681 B1 * 12/2002 Maruyama ................ E02F 7/06 241/74
2004/0148823 A1 8/2004 Schenk
(Continued)

FOREIGN PATENT DOCUMENTS

CN 1616776 A 5/2005
CN 1671923 A 9/2005
(Continued)

OTHER PUBLICATIONS

Translation of EP-2078791-A1.*
(Continued)

*Primary Examiner* — Bobby Yeonjin Kim
(74) *Attorney, Agent, or Firm* — LEASON ELLIS LLP

(57) ABSTRACT

An articulable-arm-mountable pulverisation apparatus (10) is provided for reducing material size. The apparatus (10) includes a material-receiving housing (12) having a material-processing chamber (22a), a discharge outlet portion (22b), and a drive-unit compartment (22c). The apparatus (10) also has an articulable-arm mounting element (18) for releasably attaching the apparatus (10) to an articulable arm
(Continued)

of an excavating machine. The apparatus (10) also includes a rotatable element (56) in the material-processing chamber (22a). The rotatable element (56) has a side surface which, together with an interior surface of the material-processing chamber (22a), forms a tapering pulverising material flow-path towards the discharge outlet portion (22b). A unitary drive unit (16) is provided in the drive-unit compartment (22c). The drive-unit compartment (22c) has an openable access cover (50), whereby the unitary drive unit (16) can be slidably removed in an axial direction as one-piece from the drive-unit compartment (22c) for utilisation of the unitary drive unit (16) in a different apparatus.

20 Claims, 6 Drawing Sheets

(56) References Cited

U.S. PATENT DOCUMENTS

| | | | | |
|---|---|---|---|---|
| 2010/0163660 | A1* | 7/2010 | Eriksson | B02C 25/00 241/207 |
| 2013/0146691 | A1 | 6/2013 | Malkamaki | |
| 2014/0231561 | A1 | 8/2014 | Azzolin et al. | |

FOREIGN PATENT DOCUMENTS

| | | | | |
|---|---|---|---|---|
| DE | 10311918 | A1 | 10/2004 | |
| EP | 2078791 | A1 * | 7/2009 | E02F 3/407 |
| JP | 10216549 | A | 8/1998 | |

OTHER PUBLICATIONS

International Search Report and Written Opinion in PCT Application No. PCT/GB2021/053225, mailed Mar. 18, 2022 (12 pages).

International Preliminary Report on Patentability in PCT Application No. PCT/GB2021/053225, mailed Jun. 13, 2023 (9 pages).

British Search Report in GB Application No. 2019458.5, mailed May 25, 2021 (4 pages).

British Examination Report in GB Application No. 2019458.5, mailed Dec. 14, 2023 (5 pages).

Chinese Examination Report in CN Application No. 202180007094.3, mailed Feb. 11, 2023, an English translation attached hereto (29 pages).

Chinese Decision to Refuse in CN Application No. 202180007094.3, mailed Jul. 7, 2023, an English translation attached hereto (29 pages).

* cited by examiner

ARTICULABLE-ARM-MOUNTABLE PULVERISATION APPARATUS AND METHOD OF USE THEREOF

CROSS-REFERENCE TO RELATED PATENT APPLICATIONS

This application is a U.S. National Stage Application under 35 U.S.C. § 371 of International Patent Application No. PCT/GB2021/053225 filed Dec. 9, 2021, which claims the benefit of priority of British Patent Application No. GB2019458.5 filed Dec. 10, 2020, both of which are incorporated by reference in their entireties. The International Application was published on Jun. 16, 2022, as International Publication No. WO/2022/123252.

The present invention relates to an apparatus for breaking down material to a predetermined size. The present invention also pertains to a method of breaking down materials, preferably using such an apparatus. Furthermore, the invention relates to a system which includes an excavating machine and an apparatus for breaking down material, mountable onto said excavating machine. In the mining, quarrying, recycling, and demolition industries, large and/or irregularly sized materials can be broken down or reduced in size using an apparatus to provide an end product of predetermined size. One such apparatus is a cone crusher. A cone crusher typically has a housing, also referred to as a drum or hopper; and a cone-shaped element that has a rotatable mantle. A gap is provided between the rotatable mantle and the housing. Material to be broken down enters the housing before being crushed in the gap by the action of the mantle against the housing. Once broken down to the predetermined size, the end product exits the housing via the gap.

Cone crushers are characterised in that they have gyratory rotation in-use. In other words, the mantle undergoes eccentric rotation or has epicyclic loading. As a result, the gap has a variable radial width along the circumference of the mantle.

Although new material is constantly being crushed, as only a small fraction of the mantle is crushing material at any one time, resulting in low crushing efficiency. Due to the variable radius of the gap, material exiting the apparatus may have a non-uniform size.

Existing cone crushers or other such devices for breaking down materials are also provided as large-scale dedicated devices, increasing spatial requirements to store the machines on site. Ensuring the machines are available and onsite when required increases the complexity of the logistics. Where material to be broken down is loaded into the cone crusher manually, the through-put of the cone crusher is at least in part limited by the labour force available whilst the risk of injury is increased.

It is also currently not possible to easily insert or remove individual parts of an apparatus, such as the drive unit.

The present invention seeks to provide a solution to these problems.

According to a first aspect of the present invention, there is provided an articulable-arm-mountable pulverisation apparatus for reducing material size, the apparatus comprising: a material-receiving housing having a material-processing chamber, a discharge outlet portion, and a drive-unit compartment; an articulable-arm mounting element for releasably attaching the apparatus to an articulable arm of an excavating machine; a rotatable element in the material-processing chamber and having a side surface which, together with an interior surface of the material-processing chamber, forms a tapering pulverising material flow-path towards the discharge outlet portion; and a unitary drive unit in the drive-unit compartment, the drive-unit compartment having an openable access cover, whereby the unitary drive unit can be slidably removed in an axial direction as one-piece from the drive-unit compartment for utilisation of the unitary drive unit in a different apparatus. In other words, the unitary drive unit can be removed so that it can be used in a different apparatus.

The term "pulverisation" used herein and throughout is intended to mean the breaking down of material to provide an end product of predetermined or generally predetermined size, and/or within a range of predetermined sizes. The predetermined size may include fragments, rubble, granules, stones, small rocks, gravel, or other such similar particulate matter, and as such, is not limited to powder or dust particles.

The apparatus may be modular. Individual parts of the apparatus are replaceable or more easily replaceable without requiring disassembly or substantial disassembly of the whole apparatus. This provides greater ease of use and versatility as different drive units and/or rotatable elements having different characteristics may be selected. Furthermore, replacement of any worn or broken individual parts may also be cheaper and/or faster than replacing the whole apparatus.

Material to be reduced in size may include, by way of example only, building and/or demolition materials, such as bricks; stones; rocks; mineral matter; aggregate matter; or any other material which is to be broken down.

The drive-unit compartment may extend at least in part into the material-processing chamber. Furthermore, the drive-unit compartment may extend at least in part into or through the discharge outlet portion. Compactness of the apparatus is increased.

Additionally, the drive-unit compartment may be closable or substantially closable by the rotatable element. The rotatable element may be versatile or multi-functional. The rotatable element selectably closes the drive-unit compartment and breaks down material. Separate parts performing each function are not required, simplifying manufacture, together with reducing the weight and cost of the apparatus.

Optionally, the drive-unit compartment may extend axially outside of the material-processing chamber and/or outside of the discharge outlet portion. This may facilitate the ease of locating and/or accessing the drive-unit compartment. The ease of removal and/or insertion of the drive-unit or parts thereof may be increased.

Preferably, the material-processing chamber may have a chamber axis and the rotatable element may have a rotatable-element axis of rotation which may be or be substantially coaxial with the chamber axis. The rotatable element may have symmetrical rotation, rather than eccentric or gyratory rotation. The efficiency of the apparatus may be increased. Furthermore, if a gap between the rotatable element and the interior surface of the chamber is or is substantially uniform in width along the periphery of the rotatable element, the end product may be more uniform in size.

Preferably, the rotatable element may be tapered. The taper enables a gradual wearing down of material inserted into the material-processing chamber, which may further increase uniformity in the size of the end product. Tapering of the rotatable element also increases the volume to receive material in the material-processing chamber. Greater material aggregates and/or a greater volume of material may be processed.

Optionally, the rotatable element may be a frustum. The risk of the tip of a conical or pyramidal rotatable element being damaged or broken may be reduced. The rotatable element may also be more economical to manufacture as requiring less raw materials. The rotatable element may also be lighter as a result. The power and/or energisation requirements to lift and/or rotate the rotatable element may therefore advantageously be reduced.

Beneficially, the rotatable element may be or be substantially a polygon in a transverse cross-section. Optionally, the polygon may be a decagon. A rotatable element polygonal in a cross-section transverse to the chamber axis has planar or substantially planar surfaces against which material to be broken down may abut. In turn, planar surfaces may better engage the material via a greater surface area, at least compared to a curved surface.

Alternatively, the rotatable element may be or be substantially curved, and more preferably circular in a cross-section, preferably a cross-section transverse to the chamber axis. To this end, the rotatable element may therefore be cylindrical, conical, or frustoconical.

Furthermore, the material-processing chamber may be or be substantially cylindrical. Alternatively, the material-processing chamber may be or be substantially polygonal in a cross-section, preferably transverse to the chamber axis. By being cylindrical rather than inwardly tapering in a chamber-outlet to chamber-inlet direction, the material-processing chamber may temporarily hold and/or process a greater volume of materials in one batch. Additionally or alternatively, material fragments of greater volume may be inserted through the chamber-inlet. Preferably, the material-processing chamber may further comprise a grip-enhancing element. Additionally or alternatively, the rotatable element may or may also comprise a further grip-enhancing element. Furthermore, the or each grip-enhancing element and/or further grip-enhancing element may comprise at least one rib. Rotation of the rotatable element in conjunction with at least one rib associated with the material-processing chamber may enhance the pulverising efficiency of the apparatus.

Additionally, the articulable-arm-mountable pulverisation apparatus may further comprise at least one mixing-enhancing element, extending radially from the or an interior surface of the material-processing chamber. Optionally, the at least one mixing-enhancing element may be or be substantially a trapezium in axial cross-section. The or each mixing-enhancing element may be multi-functional or versatile by having any or any combination of the following functions: increasing the breaking down of the materials by increasing shearing forces acting on the material, acting as a strengthening bracket, partitioning broken down material, and supporting and/or bracing against the rotatable element. The term "trapezium" used herein and throughout is intended to mean a four-sided shape having a pair of parallel opposite sides.

Furthermore, the articulable-arm-mountable pulverisation apparatus may further comprise a further said rotatable element, interchangeable with the first said rotatable element. Beneficially, the further said rotatable element may have a different dimension to the first said rotatable element for selecting the size of material exiting the pulverisation apparatus. The rotatable elements may be easily interchanged, for instance, if one is damaged or if a different-sized end product is required.

According to a second aspect of the present invention, there is provided an articulable-arm-mountable pulverisation apparatus for reducing material size, the apparatus comprising: a material-receiving housing having a material-processing chamber, a discharge outlet portion, and a drive-unit compartment for receiving therein a unitary drive unit which is slidably removable, optionally as a one-piece; an articulable-arm mounting element for releasably attaching the apparatus to an articulable arm of an excavating machine; and a rotatable element in the material-processing chamber and having a side surface which, together with an interior surface of the material-processing chamber, forms a tapering pulverising material flow-path towards the discharge outlet portion. The size of the broken-down material may be more homogenous. The throughput of the apparatus may be greater, which may result in a higher efficiency.

Beneficially, the articulable-arm-mountable pulverisation apparatus, preferably in accordance with the first and/or second aspects of the invention, may further comprise a scoop element. The scoop element may dispense with manual loading of material into the housing and/or increase the volume of material of a batch.

According to a third aspect of the present invention, there is provided a system comprising an excavating machine and a pulverisation apparatus, preferably in accordance with the first and/or second aspects of the invention. An existing excavating machine, such as an excavator, can be fitted with a pulverisation apparatus or module. This may be cheaper and/or logistically easier than a dedicated, single-function apparatus for breaking down material.

Optionally, the system may comprise at least two drive units, each drive unit being receivable within the drive-unit compartment of the pulverisation apparatus and being interchangeable with the other said drive unit. A damaged drive unit may easily be replaced. If a specific task requires a different drive unit, such as having a more powerful motor by way of example only, the appropriate drive unit may be inserted into the drive-unit compartment.

According to a fourth aspect of the present invention, there is provided a system comprising an excavating machine and a plurality of attachable apparatuses, at least one of which is a pulverisation apparatus, preferably in accordance with the first aspect of the invention, wherein the drive unit is usable with another of the plurality of attachable apparatuses. A single, common drive unit may be usable with a plurality of, optionally different, apparatuses. A common interface enables a plurality of, preferably different, apparatuses to be attachable to the same excavating machine.

According to a fifth aspect of the present invention, there is provided a method of pulverising material, the method comprising the steps of: a] providing an excavating machine and a pulverisation apparatus, preferably in accordance with the first and/or second aspects of the invention; b] mounting the pulverisation apparatus onto an articulable arm of the excavating machine; c] rotating the rotatable element relative to the material-receiving housing and inserting material to be pulverised into the material-receiving housing, such that the material is broken down, preferably by shearing caused by the rotation of the rotatable element relative to the material-receiving housing and/or vice-versa. As the rotatable element breaks down material across a greater area than a corresponding gyratory cone crusher, the energetic requirements of the pulverisation apparatus may be lower. The end product may therefore be more homogenous in size.

The invention will now be more particularly described, by way of example only, with reference to the accompanying drawings, in which.

Figure 1:
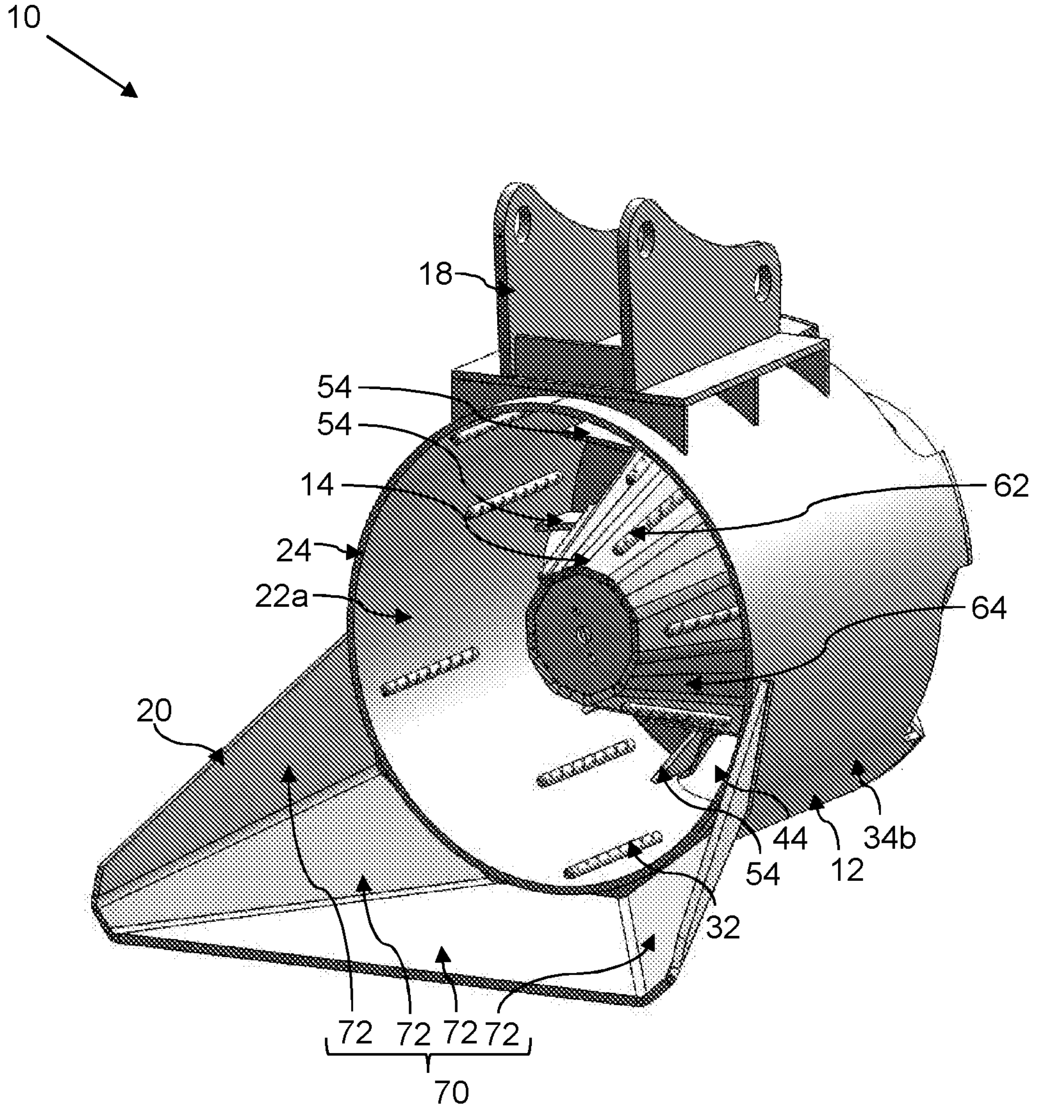
FIG. 1 shows a perspective representation of a pulverisation apparatus, in accordance with the first and second aspects of the invention, in an assembled condition.
Figure 2:
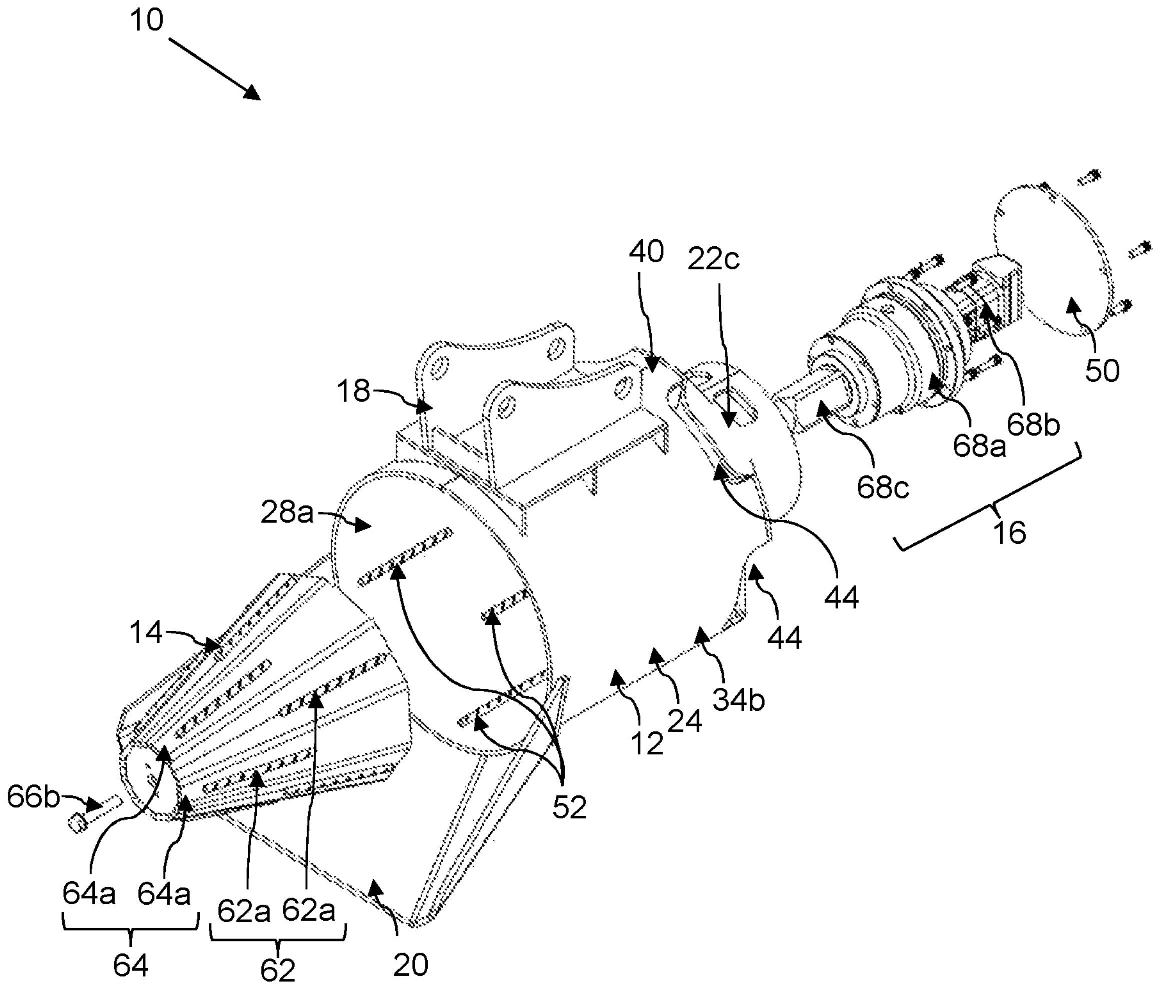
FIG. 2 shows a perspective representation of the pulverisation apparatus of FIG. 1, in an exploded condition.

Referring firstly to FIG. 1, there is shown an apparatus, indicated generally at 10 for breaking down or reducing the size of the material. In other words, the apparatus 10 is adapted to reduce material size. In FIG. 1, the apparatus 10 is shown in an assembled condition. FIG. 2 shows the same apparatus 10 in an exploded view.

The apparatus 10 may comprise metal, plastics, any other suitable material, or any combination of the above. More preferably, the apparatus 10 or parts thereof is rigid cast or moulded metal, but other forms of material may be considered. Preferably, the apparatus 10 or parts thereof may be easily connectable and disconnectable, although this feature may be omitted. This may increase the ease of replacement. The apparatus 10 may therefore be modularly-assembleable. Preferably, the apparatus 10 is connectable to or mountable onto an excavating machine, preferably an articulable arm thereof, although this feature may be omitted. The apparatus 10 may be referred to as an articulable-arm-mountable pulverisation apparatus, module or attachment, a pulverisation apparatus, or pulverising apparatus, fragmentation or fragmentalisation apparatus. The apparatus 10 has a housing 12, a rotatable portion 14, at least one drive unit 16, an articulable-arm mounting element 18, and a scoop 20, although any of these features may be omitted.

The housing 12 in-use receives and/or holds fora period of time material to be broken down. The housing 12 is therefore at least partly hollow to receive materials therein. The housing 12 may alternatively be referred to as a material-receiving housing, a container, a drum, or a hopper. The housing 12 preferably has a material-processing chamber 22*a*, a discharge outlet portion 22*b*, and a drive-unit compartment 22*c*, although any of the last two features may be omitted.

The housing 12, and more preferably, the material-processing chamber 22*a* thereof, acts together with the rotatable portion 14 to break down material inserted into the housing 12 in use. The material-processing chamber 22*a* may also be referred to as a main body or primary compartment. More preferably, at least one of: the material-processing chamber 22*a* and the rotatable portion 14 is rotatable relative to the other in use preferably only the latter in the present embodiment. The cooperation of the material-processing chamber 22*a* and the rotatable portion 14 together breaks up the material in use.

Although in the present embodiment, the rotatable portion 14 is rotatable, in an alternative embodiment, the rotatable portion may not be rotatable. For instance, the housing or part thereof may be rotatable.

Figure 3:
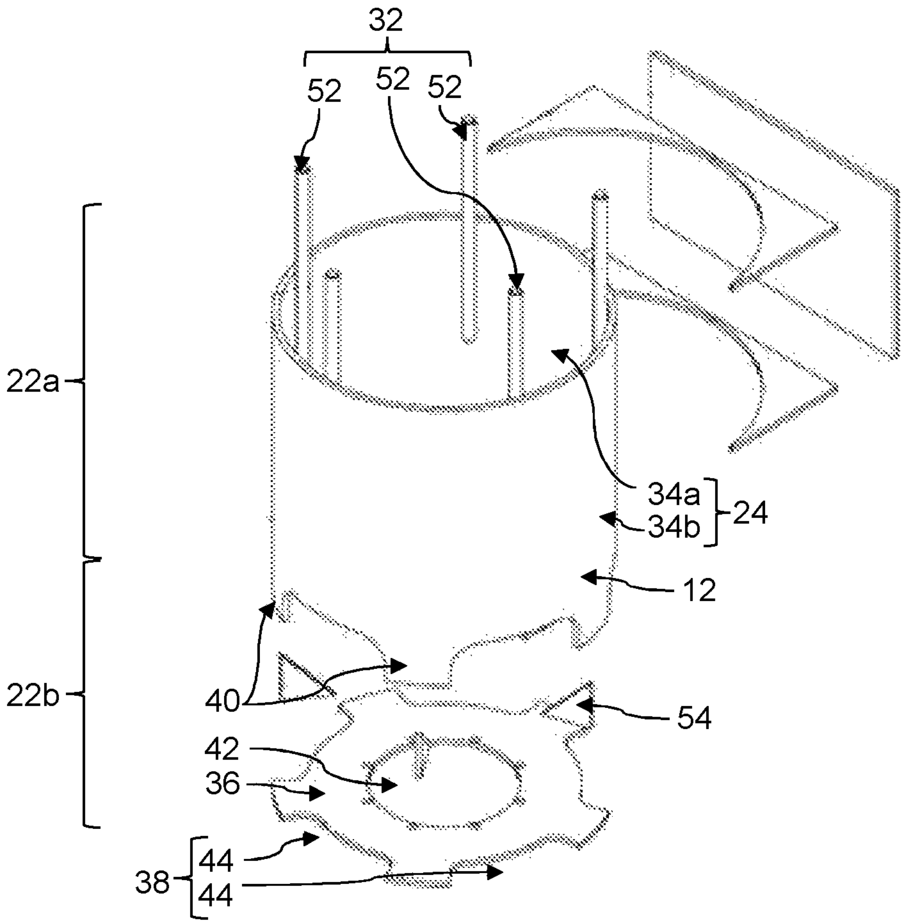
FIG. 3 shows a perspective representation of a housing of the apparatus of FIG. 1, in an exploded condition, with part of a scoop, part of an articulable-arm mounting element, some chamber-ribs and some mixing-enhancing elements omitted for clarity.
Figure 4:
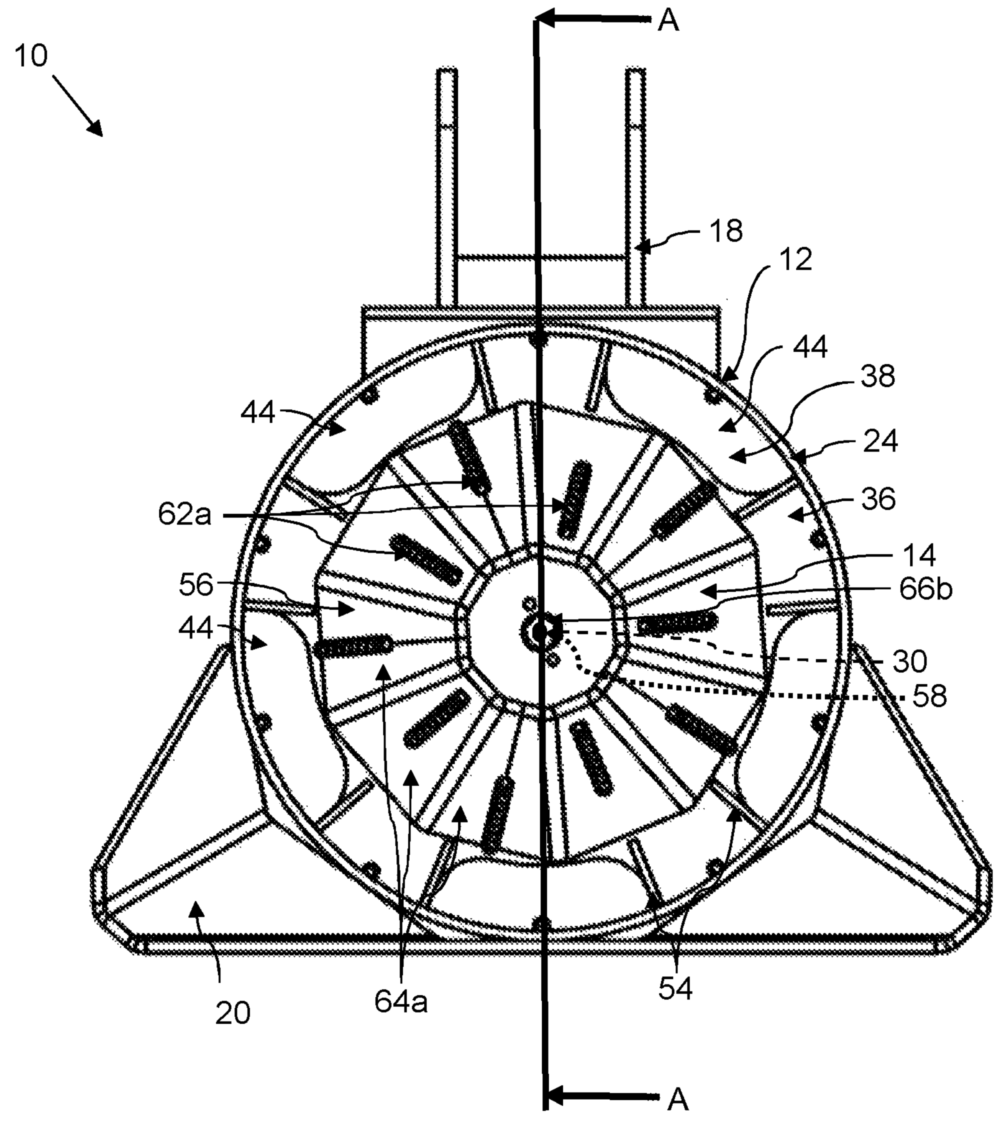
FIG. 4 shows a front representation of the apparatus of FIG. 1.
Figure 5:
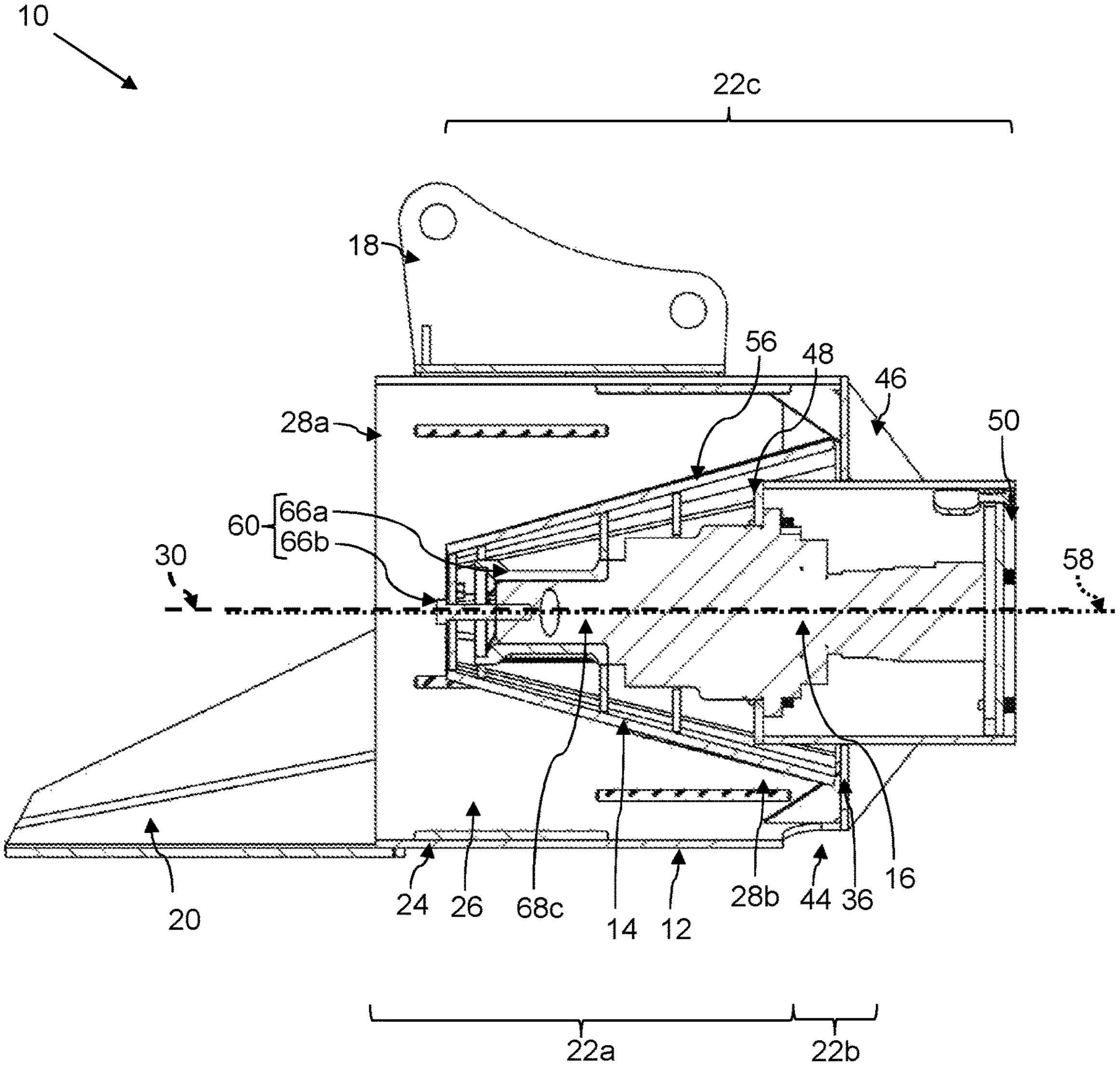
FIG. 5 shows a side cut-away representation of the apparatus of FIG. 4 along the line A-A.

As shown in FIG. 3, the material-processing chamber 22*a* has at least one chamber-wall 24, a chamber volume 26, a chamber-inlet 28*a*, and a chamber-outlet 28*b*. The material-processing chamber 22*a* may further comprise a chamber axis 30 and a grip-enhancing element 32 as shown in FIGS. 4 and 5, but either or both features may be omitted. If one chamber-wall 24 is provided, the chamber-wall 24 has an interior surface 34*a*, and an outer surface 34*b*. If a plurality of chamber-walls 24 is provided, each chamber-wall 24 may have an interior-surface portion and/or an outer-surface portion. The plurality of interior-surface portions collectively forms an interior surface 34*a*. Similarly, the plurality of outer-surface portions collectively forms an outer surface 34*b*.

The apparatus 10 may be considered to have a front-to-back direction or orientation, wherein the material to be pulverised is inserted into the chamber-inlet 28*a*, corresponding to the front, and wherein the pulverised material exits the apparatus 10 via an exit, corresponding to the back. For clarity, this terminology may be maintained even when the apparatus 10 may be oriented differently, for example when the chamber-inlet 28*a* faces away from a ground surface, by way of example only.

The interior surface 34*a* may also be referred to as an inner surface, a cone-facing surface, rotatable-portion-facing surface, or a pulverising chamber-surface. The interior surface 34*a* and/or outer surface 34*b* are preferably curved in transverse cross-section, but non-curved or part curved may be options. Preferably, the material-processing chamber 22*a*, or at least one of: the interior surface 34*a* and the outer surface 34*b* is or is substantially circular in a cross-section transverse to the chamber axis 30 but non-circular may be an option. Most preferably, the material-processing chamber 22*a* is or is substantially cylindrical but non-cylindrical may be an option. In other words, the material-processing chamber 22*a* does preferably not taper in any direction.

The chamber-outlet 28*b* connects the material-processing chamber 22*a* to the discharge outlet portion 22*b*. The chamber-outlet 28*b* has an aperture or opening, preferably only one, but a plurality of apertures may be envisioned. The chamber-outlet 28*b* in-use provides an access or conduit for broken up material to exit the material-processing chamber 22*a*.

The chamber axis 30, indicated as a dashed line in FIG. 5, is preferably centrally positioned in the chamber volume 26 and/or housing 12, but non centrally positioned may be an option.

The discharge outlet portion 22*b* is the portion of the housing 12 which in-use provides a conduit or access for the pulverised material to exit the apparatus 10. The discharge outlet portion 22*b* has at least an end wall or plate 36 which may be planar, non-planar, or part planar, and an outlet 38. The discharge outlet portion 22*b* also has one or more side walls 40 and a through bore 42 through which at least part of the drive-unit compartment 22*c* and/or the drive unit 16 may extend, but any of these features may be omitted. The one or more side walls 40 may optionally be connectable, connected, or integrally formed with the at least one chamber-wall 24. The outlet 38 comprises at least one, and here a plurality of apertures 44. The or each aperture 44 may be formed by a through-bore or a recess in at least one of: the end wall 36, and the, each or a said side wall 40. One or more reinforcement struts 46 may optionally be provided.

The drive-unit compartment 22*c* may in-use receive and/or protect at least part of the drive unit 16. Preferably, the drive unit 16 is removable from and/or insertable into the drive-unit compartment 22*c*, optionally as one piece, but non-removable may be an option. Preferably, the drive unit 16 is slidably removable and/or insertable. Preferably, the drive-unit compartment 22*c* may only receive one drive unit 16 at a time, but it could be envisioned that the drive-unit compartment may receive a plurality of drive units simultaneously.

As shown, the drive-unit compartment 22*c* extends outside of or from the material-processing chamber 22*a* and/or the discharge outlet portion 22*b*, but any of these features may be, once again, omitted.

The drive-unit compartment 22*c* preferably also extends at least in part into or through the discharge outlet portion 22*b* as shown, but this feature is optional. More preferably, a wall or walls of the drive-unit compartment 22*c* may be connected or connectable with the end wall 36, preferably at or adjacent to the through bore 42 of the discharge outlet portion 22*b*. The wall or walls of the drive-unit compartment 22*c* may optionally extend beyond the through bore 42 and at least partly into the material-processing chamber 22*a*. The drive-unit compartment 22*c* extends preferably axially or substantially axially, or parallel to the chamber axis 30 from the discharge outlet portion 22*b* and/or material-processing chamber 22*a*, but these features may be omitted. The drive-unit compartment 22*c* is preferably tubular or cylindrical but any non-tubular or non-cylindrical shape is an option.

The drive-unit compartment 22*c* may have at least one access opening. The access opening may be permanently open or selectably openable. If selectably openable, the access opening may be at least partly closable or substantially closable, or sealable. Preferably an access opening is provided at or adjacent to the back end of the housing 12 and/or drive-unit compartment 22*c*. Additionally or alternatively, a further access opening may be provided at, adjacent to, or facing the front end of the housing 12 and/or drive-unit compartment 22*c*. The drive-unit compartment 22*c*, and more preferably, the access opening and/or further access opening may even be closable by the rotatable portion 14 or part thereof. The rotatable portion 14 may even form or at least partly complete, form or define at least part of the drive-unit compartment 22*c*. The ability to selectably open and close an access opening to the drive-unit compartment 22*c* by the rotatable portion 14 or part thereof may enable the drive unit 16 to be accessible and/or at least parts thereof to be easily inserted and/or removed from the front of the housing 12.

The drive-unit compartment 22*c* may optionally have at least one abutment lip or edge 48 against which the drive unit 16 may abut and/or to which the drive unit 16 may be connectable. The drive-unit compartment 22*c* may also optionally have an openable access cover 50, but this feature may be omitted.

The openable access cover 50 has a protective and/or sealing function. More preferably, the openable access cover 50 may in-use prevent or inhibit access to an internal volume of the drive-unit compartment 22*c* and/or to a drive unit 16 received within the drive-unit compartment 22*c*. The openable access cover 50 may be connectable or connected to the drive-unit compartment 22*c*. The openable access cover 50 may be receivable inside the material-processing chamber 22*a* and/or a discharge outlet portion 22*b* but preferably is positionable or engageable with the back or outer end portion of the drive-unit compartment 22*c*. More preferably, the openable access cover 50 is engageable with the access opening at or adjacent to the back end.

As previously mentioned, the material-processing chamber 22*a* preferably also has a grip-enhancing element or grip-enhancer 32, but this feature may be omitted. The grip-enhancing element 32 is preferably associated with or disposed on the interior surface 34*a*. Preferably the grip-enhancing element 32 in-use may reduce, inhibit, oppose, or prevent at least lateral translation of material relative to the interior surface 34*a*. Furthermore, the grip-enhancing element 32 does not reduce, inhibit, oppose, or prevent translation axially or longitudinally along the interior surface 34*a* but this feature may alternatively be provided.

In the preferred embodiment, the grip-enhancing element 32 comprises at least one, and preferably as shown, a plurality of ribs, referred to as chamber-ribs 52 for clarity.

Although preferably chamber-ribs are provided, the grip-enhancing element may additionally or alternatively comprise a protrusion; a projection; a groove; a slit; a coating, layer, or portion having increased friction; or any other suitable feature which may in use enhance shearing effectiveness. Each chamber-rib 52 is preferably linear but non-linear may be an option, such as curved, part-curved, saw-toothed, sinusoidal, or any other suitable shape, pattern, or configuration. The, each, or at least one chamber-rib 52 may be connectable or connected but preferably is integrally formed with the interior surface 34*a*. The at least one chamber-rib 52 may extend at least partly in an axial or longitudinal direction. Thus, the at least one chamber-rib 52 may have a longitudinal extent. Preferably, the, each or at least one said chamber-rib 52 only extends in the axial or longitudinal direction. However, it could easily be envisioned, that the, each or at least one chamber-rib may additionally or alternatively extend at least partly in or solely in a lateral or transverse direction. In other words, a said chamber-rib may extend circumferentially or perimetrically along the interior surface 34*a*.

At least one chamber-rib 52 may extend from a position axially spaced-apart from the chamber-inlet 28*a*. Additionally or alternatively, at least one chamber-rib 52 may extend to a position axially spaced-apart from the outlet 38 and/or chamber-outlet 28*b*. In other words, at least one chamber-rib 52 may have a longitudinal extent which may be less than a longitudinal extent of the material-processing chamber 22*a* and/or the material-processing chamber 22*a* and the discharge outlet portion 22*b*. In the preferred embodiment, at least one, and preferably as shown, each chamber-rib 52 extends along a minor portion of the longitudinal extent of the housing 12, but a major portion may be envisioned. A plurality of chamber-ribs 52 may be axially and/or laterally staggered, regularly and/or irregularly, along and/or around the interior surface 34*a*, but non-staggered may be an option. As shown, the chamber-ribs 52 are preferably alternatively axially staggered.

Furthermore, the apparatus 10 may optionally comprise at least one, and here a plurality of mixing-enhancing elements 54. The or each mixing-enhancing element 54 may be referred to as a mixing-enhancing part, a partition, a partitioning element, a fin, a fin element, a structural support element, a spacer, or a centering element. Each mixing-enhancing element 54 is connectable, connected, or integrally formed with the end wall or plate 36, and at least one of: the or a said side wall 40 of the discharge outlet portion 22*b* and the or a said chamber-wall 24. Two or more mixing-enhancing elements 54 are preferably spaced apart laterally or perimetrically around the interior surface 34*a*.

Each mixing-enhancing element 54 is preferably planar or substantially planar but non-planar may be an option. Each mixing-enhancing element 54 may extend in an axial or longitudinal plane, which may or may not include the chamber axis 30. Additionally or alternatively, each mixing-enhancing element 54 may extend in a lateral or transverse plane. Most preferably, the, each or at least one mixing-enhancing element 54 may extend radially inwards from the interior surface 34*a* and axially away from the chamber-inlet 28*a*, as shown in FIG. 5. In side view or axial cross-section, each or at least one mixing-enhancing element 54 may be or be substantially a trapezium in transverse and/or axial cross-section, although any non-trapezium may be envisioned. By way of example only, a mixing-enhancing element may be triangular in transverse and/or axial cross-section. More preferably, each mixing-enhancing element 54 may be an isosceles trapezium but any non-isosceles trapezium may be envisioned.

The or each mixing-enhancing element 54 in use may have any or any combination of the following functions. A first function of each mixing-enhancing element 54 may be to improve pulverisation by preventing, inhibiting, or opposing lateral translation of material in the material-processing chamber 22*a*. This may enable and/or enhance shearing forces to act on the material to be broken down. A second function of each mixing-enhancing element 54 may be to provide a structural reinforcement. In other words, a mixing-enhancing element 54 may function as a reinforcing bracket or strut. A third function may be to partition broken down material into the exit apertures 44. Distributing pulverised material across a plurality of apertures 44 may reduce the risk of obstructing any of the apertures 44. A fourth function of each mixing-enhancing element 54 may be to prevent or inhibit any lateral displacement of the rotatable portion 14 or part thereof away from its in-use position and/or away from the chamber axis 30. To this effect, each mixing-enhancing element 54 may be at or adjacent to, optionally abuttable against, or otherwise positioned to be able to impart to part to the rotatable portion 14 a restoring force if necessary. The restoring force is preferably at least partly radially inwards. In the present embodiment, each mixing-enhancing element 54 may therefore have a centering role.

The rotatable portion 14 in-use acts together with the material-processing chamber 22*a* to break down, grind, or pulverise material into a smaller, end product. The rotatable portion 14 has a rotatable element 56, an axis 58, and a rotatable-element mount 60, although any of the above features may be omitted. The rotatable element or rotatable part 56 is preferably rotatable relative to the housing 12. Preferably, the rotatable element 56 also has at least one grip-enhancing element or grip-enhancer 62, but this feature may be omitted. Furthermore, the rotatable element 56 is positioned or positionable at least partly within the material-receiving housing 12, and more preferably at least partly within the material-processing chamber 22*a*. Preferably, the rotatable element 56 in-use extends along or substantially along the chamber axis 30 and/or longitudinally between the chamber-inlet 28*a*, and the outlet 38 and/or the chamber-outlet 28*b*. The rotatable element 56 is tapered but non-tapered may be an option. Preferably, the rotatable element 56 tapers in at least one dimension. Preferably the rotatable element 56 tapers inwards from at least the chamber-outlet 28*b* to the chamber-inlet 28*a*. In other words, the rotatable element 56 flares, expands or tapers outwards along the flow-path and/or axially from front-to-back. As such, the chamber-outlet 28*b* may be disposed at or adjacent to where the rotatable element 56 is closest to the interior surface 34*a*.

Optionally, as shown, the rotatable element 56 may extend at least in part into the discharge outlet portion 22*b*. If the rotatable element 56 tapers outwards, expands or increases further axially in the front-to-back direction in the discharge outlet portion 22*b*, the gap between the rotatable element 56 and the material-processing chamber 22*a* may be even smaller than at the chamber-outlet 28*b*. In other words, the chamber-outlet 28*b* may not necessarily be disposed at where the rotatable element 56 is closest to the interior surface 34*a*.

Furthermore, the rotatable element 56 is or is substantially a polygon in a longitudinal cross-section and/or in a cross-section transverse to the chamber axis 30, but a non-polygonal shape may be envisioned. More preferably, the polygon in transverse cross-section is a decagon but any alternative polygon may be an option. Furthermore, the rotatable element 56 may be a frustum or truncated, but this feature may be omitted. In other words, the rotatable element 56 is most preferably a frustum of a decagonal-based pyramid. The rotatable element 56 has a side surface 64. The side surface 64, together with the interior surface 34*a* of the material-processing chamber 22*a*, forms a pulverising material flow-path towards the discharge outlet portion 22*b*. Preferably, at least one of the rotatable element 56 and material-processing chamber 22*a* tapers such that the pulverising material flow-path may be tapering. If the rotatable element 56 is a polygon in a cross-section transverse to the chamber axis 30, as in the shown embodiment, the rotatable element 56 may have a plurality of side surface sections 64*a*. The plurality of side surface sections 64*a* may together form the side surface 64. The or each surface section 64*a* is preferably at least partly planar.

The axis 58 may be referred to as a rotatable-element axis or axis of rotation for clarity. The rotatable-element axis 58 is or is substantially coaxial, coaligned, or coalignable with the chamber axis 30. Coaxial alignment may provide symmetric rotation of the rotatable element 56 or part thereof relative to the material-receiving housing 12 and/or to the material-processing chamber 22*a*. In other words, the rotatable element 56 does preferably not undergo gyratory or eccentric rotation in-use. Although coaxial alignment is preferred, non-coaxial alignment may be an option. Non-coaxial may include parallel or non-parallel alignment of the axes.

The rotatable-element mount 60 may also be referred to as a cover mount, or a drive-unit-interfacing element. The rotatable-element mount 60 in-use enables the rotatable element 56 to be mountable or mounted, connected or connectable to any or any combination of: the drive-unit compartment 22*c*, the drive unit 16, the material-processing chamber 22*a*, and the discharge outlet portion 22*b*. The rotatable-element mount 60 preferably includes a framework 66*a* and a fastening means 66*b* but either of these features may be omitted.

The framework 66*a* may optionally have one or more abutment portions which are engageable with the rotatable element 56, preferably an inner surface thereof, at one or more engagement points, lines or surfaces. The framework 66*a* may space apart and/or maintain or substantially maintain the side surface 64 and/or a side surface section 64*a* at a predetermined distance from the chamber axis 30. Preferably, the plurality of engagement points, lines, or surfaces may be spaced-apart axially and/or laterally for providing a more stable engagement with the rotatable element 56. The framework 66*a* may optionally comprise a shaft-engagement portion or cap. The shaft-engagement portion may be complementarily-shaped to receive a shaft or other rotatable part of the drive unit 16 therein. The shaft-engagement portion may optionally be engageable with the shaft by interference fit and/or via a connector. In the preferred embodiment, the shaft-engagement portion may have a recess which may be rectangular or square in cross-section.

The fastening means or fastener 66*b* may comprise at least one bolt, screw, or another suitable fastener. In the preferred embodiment, the fastener 66*b* comprises a shaft locking bolt which allows the rotatable element 56 to be connectable or fastenable to at least one of: the drive-unit compartment 22*c*, the material-processing chamber 22*a*, the discharge outlet portion 22*b*, the drive unit 16, and the framework 66*a*. The fastener 66*b* may even optionally in-use tension part of the drive unit 16 against the lip, or edge 48, directly and/or indirectly.

It may easily be envisioned however that the rotatable element may only be connectable to the drive unit, which may reduce friction, albeit at a potentially greater risk of lateral displacement of the rotatable element relative to chamber axis and/or housing.

Preferably, the rotatable element 56 or part thereof is separably engageable with the material-receiving housing. This may enable replacement and/or adjustment of the size of pulverised material exiting the apparatus 10. Optionally, the pulverisation apparatus 10 may further comprise at least one further said rotatable element 56, which may be interchangeable with the first said rotatable element 56. Optionally, the or a further said rotatable element 56 may have a different dimension, size and/or shape to the or a notionally first said rotatable element 56. By way of example only, the dimension may be any or any combination of: the width, height, a taper angle or angle of the side surface 64 and/or a side surface section 64*a* relative to the chamber axis 30. This may enable users to select the size and/or shape of material exiting the apparatus 10.

The drive unit 16 in-use provides or transmits torque to the rotatable portion 14 and/or the rotatable element 56. The drive unit 16 may be referred to as a rotary drive unit. Preferably, the drive unit 16 is a unitary one-piece, but non-unitary may be envisioned. The drive unit 16 includes a drive-unit housing 68*a*, a motor assembly 68*b*, and a force transmission means 68*c*, although any of these features may be omitted. The drive unit 16 is typically hydraulically driven from the excavating machine.

The drive-unit housing 68*a* is generally cylindrical, although non-cylindrical or part cylindrical may be envisioned. If provided, the drive-unit housing 68*a* may protect and/or receive at least part of the motor assembly 68*b* and/or the force transmission means 68*c*.

The motor assembly 68*b* may optionally include a G roller motor. The motor assembly 68*b* in-use drives the force transmission means 68*c*. The force transmission means 68*c* is preferably positioned internally and coaxially with the drive-unit housing 68*a*. The motor assembly 68*b* is drivable by a power output of an excavating machine or other suitable machine having a primary, typically motive, permanently installed drive unit. Such an excavating machine is preferably fitted with a suitable releasably connectable and controllable, optionally hydraulic, power take-off. Although a G roller motor is suggested, any suitable motor, such as a hydraulic or piston, electric, pneumatic, or internal combustion motor, may be utilised to drive the force transmission means 68*c*. The drive unit 16 may optionally be devoid of a drainage hose or drain line.

The force transmission means also referred to as a drivable output means or a force transmitter 68*c*. The force transmission means 68*c* includes a rigid elongate shaft to which the fastener 66*b* may be connectable, and a planetary or epicyclic reduction drive or gears, but any of these features may be omitted. The rigid elongate shaft preferably extends axially through the generally cylindrical drive-unit housing 68*a*.

A suitable drive unit 16 may comprise any of: an earth drill head or hub, a stump planer hub, a log split hub, a cement mixer hub, or any other suitable machine or motor capable of directly or indirectly imparting a rotary force. An example of a suitable drive unit 16 may include an Auger Torque earth drill head, more preferably a series 3.5 Auger Torque earth drill head. The, preferably unitary, drive unit 16 can be slidably removed in an axial direction as one-piece from the drive-unit compartment 22*c*. This may enable the drive unit 16 to be useable in a different apparatus, whether an articulable-arm-mountable pulverisation apparatus 10 and/or a different apparatus altogether.

Similarly to the rotatable element 56, a plurality of drive units 16 may be provided. The drive units 16 may be identical and/or may differ from each other. Preferably, however, all drive units 16 are interchangeable and/or interchangeably receivable within the drive-unit compartment 22*c*. The or each grip-enhancing element 62 of the rotatable element 56 may be referred to as a further grip-enhancing element, or a second grip-enhancing element for clarity. The or each further grip-enhancing element 62 of the rotatable element 56 may comprise at least one rib 62*a*. For clarity, the or each rib of the rotatable element 56 may be referred to as a rotatable-element rib 62*a*. Although preferably rotatable-element ribs are provided, the further grip-enhancing element 62 may additionally or alternatively comprise a protrusion; a projection; a groove; a slit; a coating, layer, or portion having increased friction; or any other suitable feature which may in use enhance shearing effectiveness.

The at least one rotatable-element rib 62*a* may extend on the side surface 64 and/or on a said side surface section 64*a*. A said rotatable-element rib 62*a* may extend along an edge of a side surface section 64*a* and/or on a face thereof. A side surface section 64*a* may have a plurality of rotatable-element ribs 62*a* and/or a plurality of side surface sections 64*a* may have at least one rotatable-element rib 62*a*. The or each rib may be similar to the at least one rib of the housing 12 such that detailed description of the common features may be omitted for brevity.

As previously mentioned, the apparatus 10 may also comprise an articulable-arm mounting element 18 and a scoop 20, although any of these features may be omitted.

The articulable-arm mounting element, part or connector or articulable-arm mount 18 enables releasable attachment of the apparatus 10 to an articulable arm of an excavating machine. In other words, the mounting element 18 is adapted to releasably attach the apparatus 10 to an articulable arm of an excavating machine. The articulable-arm mounting element 18 may be connectable, connected, or preferably, is integrally formed with the housing 12. The articulable-arm mounting element or connector 18 may be disposed on the housing 12 opposite or substantially opposite the scoop 20 laterally around the perimeter of the housing 12. In the preferred embodiment, the articulable-arm mounting element 18 is provided as a hitch mounting, and more preferably as a double pin hitch. A standard single pin hitch or a double pin cradle hitch or any other suitable mounting element may also be utilised, as required.

The scoop or scoop element 20 may be connectable, connected, or preferably, integrally formed with the housing 12, at or adjacent to the chamber-inlet 28*a*. The scoop 20 has a scoop body 70. The scoop body 70 optionally tapers inwards to the chamber-inlet 28*a*. This shape may increase the volume of material per batch. The scoop body 70 has a plurality of sub walls 72. Each or at least one of the sub walls 72 is preferably planar but non-planar or partly planar may be envisioned. Furthermore, at least one, and preferably two sub walls 72 provide side walls for further guiding scooped material towards the chamber-inlet 28*a*. An outer edge of the scoop body 70 may be linear and/or non-linear. Each sub wall 72 may have an edge. The edge of at least one sub wall 72 may be linear, or at least partly linear. This may in-use facilitate insertion of the scoop 20 adjacent or against a ground surface beneath material to be pulverised. Although preferably not in the present embodiment, one or more teeth or teeth-like elements may be provided, extending from an edge of the scoop body 70.

The apparatus 10 may optionally be provided together with an excavating machine 74, as part of a system. Optionally, the system may include a plurality of attachable apparatuses, at least one of which is a pulverisation apparatus 10. A single drive unit 16 may be usable with different attachable apparatuses. Furthermore, the system may optionally comprise at least two drive units 16, each drive unit 16 being receivable within the drive-unit compartment 22*c* of the pulverisation apparatus 10 and being interchangeable with the other said drive unit 16.

The excavating machine, also referred to as an earth-moving-tool machine, earth-moving machine, wheeled or tracked vehicle 74 may include an excavator, a digger, a backhoe, a track hoe, a mini loader, a truck crane, a skid-steer loader, or any machine having a controllable articulated arm to name a few variants of suitable excavating machines 74. The articulable arm is preferably hydraulic. In this case, the arm may form part of a hydraulic actuatable machine comprising one or more fluid lines running along the arm, to provide a power take-off at or adjacent to a distal end of the arm. The excavating machine 74 may be 20.0 Tonnes (T) or less, although greater than 20.0 T may be an option. Tonnes are preferably metric tonnes here, although non-metric tonnes may be envisioned. More preferably, the excavating machine 74 may be less than 18.0 T. Most preferably, the excavator is 15.0 T at most. Furthermore, the excavating machine 74 may be at least 2.0 T, although less than 2.0 T may be an option. More preferably, the excavating machine 74 may be at least 4.0 T. Most preferably, the excavating machine 74 is at least 4.5 T.

In use, the apparatus 10 is assembled prior to use. If there is a choice of drive units, for example having different power requirements, a suitable drive unit 16 is selected. The drive units 16 are preferably interchangeable with each other. The drive unit 16 is inserted into the drive-unit compartment 22*c*. Preferably, the drive-unit compartment 22*c* is open at or adjacent to the backend of the apparatus 10. The user may therefore slide the drive unit 16 or part thereof via the access opening at or adjacent to the backend, although non-slidable insertion may be envisioned. As the drive-unit compartment 22*c* extends preferably axially, the drive unit 16 is preferably axially received in the drive-unit compartment 22*c*, but non-axially may be an option. The access opening may optionally be closed by the openable access cover 50. If the drive-unit compartment 22*c* comprises a further access opening closable by the rotatable portion 14, the drive-unit compartment 22*c* is then closed or substantially closed by the rotatable portion 14, or at least the rotatable element 56 thereof. If there is a choice of rotatable elements 56, a rotatable element 56 is selected according to the requirements. For example, different rotatable elements 56 may provide an end product of a different size.

The rotatable element 56 is connected to the drive unit 16 such that the rotatable element 56 may be driven to rotate. In particular, the shaft-engagement portion is engaged with the shaft of the drive unit 16 and/or the abutment portion or portions of the framework 66*a* engage with the rotatable element 56.

The assembled apparatus 10 may crush pieces of a range of sizes. The size may be measured along the maximum or minimum extent, or any dimension, length, or diameter of a piece. Alternatively, the size may be an average extent of the piece. Preferably, the maximum extent or major dimension of pieces to be broken down is in the range of 100 mm to 800 mm, although any value outside of that range may be envisioned. More preferably, the pieces to be broken down have a maximum extent in the range of 200 mm to 600 mm, and most preferably between 44 mm and 500 mm.

The weight of the assembled apparatus 10 may be within the range of 50 kg to 3500 kg, although outside of this range may be an option. More preferably, the weight is within the range of 100 kg to 500 kg and most preferably, the weight is or is about 300 kg.

The apparatus 10 is preferably provided with an excavating machine 74. The apparatus 10 may be connected or mounted to the excavating machine 74, preferably onto the or an articulable arm thereof. The excavating machine 74 may already be on-site and/or used for additional purposes. This is done via the double pin hitch. The apparatus 10 may be powered by the drive unit 16 if comprising a power source and/or by the excavating machine 74. To disassemble the apparatus the above steps may be performed in reverse.

Figure 6:
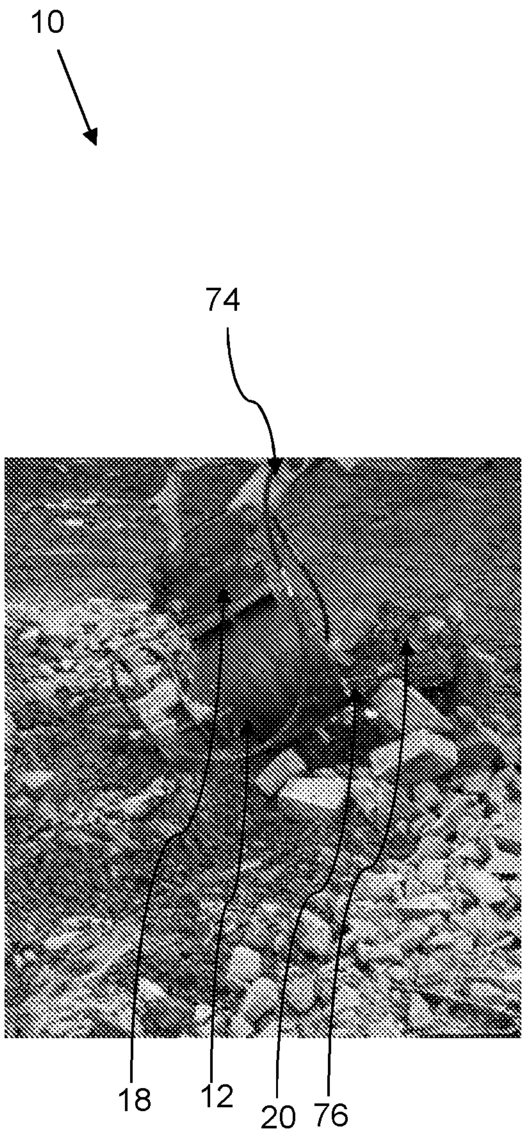
FIG. 6 shows a side view of a system in accordance with the third aspect of the invention, in-use in accordance with the fifth aspect of the invention, wherein the material to be broken down is being scooped into the apparatus.

To break down material 76, the excavating machine 74 lowers the apparatus 10 and scoops up material 76 into the scoop 20 if provided and/or into the chamber-inlet 28*a*. This is shown in FIG. 6. No manual involvement is required, although not excluded. The apparatus 10 may temporarily hold a maximum volume of 3 cubic metres or less, and more preferably 2 cubic metres or less. Most preferably, the maximum volume of material 76 to be processed receivable within the apparatus 10 is 1.5 cubic metres.

Figure 7:
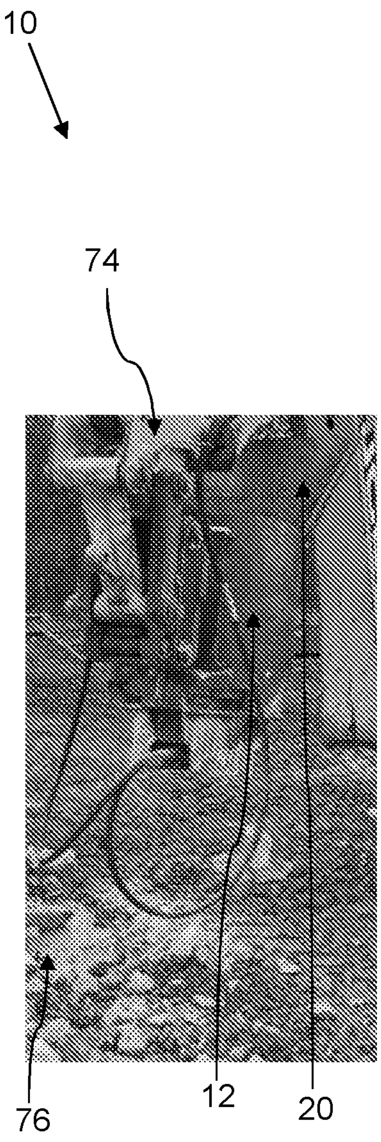
FIG. 7 shows a side view of the system of FIG. 6, wherein the material is being broken down by the pulverisation apparatus.

The apparatus 10 is rotated or tilted towards a vertical direction, with the chamber-inlet 28*a* facing upwards to prevent or minimise material 76 from falling out. The apparatus 10 is most preferably vertical as this distributes material 76 around the housing 12 more equally, but this is not a requirement. This is shown in FIG. 7.

After, during, or preferably before inserting material 76 into the material-processing chamber 22*a*, at least one of the rotatable element 56 and the material-processing chamber 22*a*, preferably the former, is made to rotate relative to the other.

Preferably the rotatable element 56 may rotate at an angular velocity of at least 18 RPM, although lower than 18 RPM may be envisioned. More preferably, the rotatable element 56 may have an angular velocity of at least 25 RPM, and most preferably of at least 33 RPM.

Furthermore, the rotatable element 56 may have an angular velocity of 100 RPM or less, although greater than 100 RPM may be an option. More preferably, the angular velocity may be 90 RPM or less, and most preferably is 70 RPM or less. The angular velocity may be dictated by the flow rate of material through the apparatus 10.

Preferably, the pressure exerted on the material 76 may be at least 40 bar or about 4,000 kPA, although a pressure smaller than 4,000 kPA may be applied. The pressure is more preferably at least 60 bar or about 6,000 kPA, and most preferably is at least 80 bar or about 8,000 kPA. Similarly, the pressure exerted on the material 76 may be at most 500 bar or about 50,000 kPA, although a pressure greater than 50,000 kPA may be applied. The pressure is more preferably at most 300 bar or about 30,000 kPA, and most preferably is at most 240 bar or about 24,000 kPA. The rotation of the rotatable element 56 breaks down, crushes, grinds, or pulverises the material 76 into smaller pieces. This is primarily achieved via applying torque, resulting in breaking forces being applied to the material. Preferably the breaking forces are or include shearing forces. Thus, the material 76 is broken down by shearing caused by the rotation of the rotatable element 56 relative to the material-receiving housing 12. At high RPM of the rotatable element 56, it may be possible that the breaking forces may also include centrifugal forces and/or the impact force of material 76 being projected radially outward against the housing 12.

If the rotatable element is gyratory or undergoes eccentric rotation, the breaking forces may be or may include compression or crushing forces instead or in addition to shearing forces. In this case, the apparatus may be referred to as a cone crusher.

The grip-enhancing elements 32 and/or the mixing-enhancing elements 54 may further enhance the breaking forces applied. Once the material 76 is broken down to a size small enough to enter a gap provided between the rotatable element 56 and the housing 12, the broken-down material 76 exits the housing 12 through the outlet 38. The size of the resulting, end product may be within a range of 1 mm to 200 mm, although beyond either end of this range may be an option. More preferably, the size of the end product may be within the range of 5 mm to 150 mm, and most preferably, in the range of 10 mm to 120 mm.

As the rotatable element 56 is symmetrically rotatable, the gap or chamber-outlet 28*b* preferably has a uniform or substantially uniform width. This may provide a more uniform size of end product, compared to a cone crusher having eccentric rotation. Additionally or alternatively, mixing may be increased. Furthermore, as material 76 is being processed along the whole or substantially the whole perimeter of the rotatable element 56 at any one time, the efficacy of the apparatus 10 may potentially be greater than a gyratory cone crusher, although this feature may be omitted.

Once the housing 12 is at least partly empty, the user may scoop new material 76 into the apparatus 10 and repeat the above steps.

The end product may then be re-used on-site and/or more easily be removed, for instance, due to greater compactness. If any part of the apparatus 10 needs to be changed, for example, due to wear or to change the end product by selecting a different rotatable element 56, any part can be individually or independently replaced.

Although the ribs of the housing and the rotatable element preferably only extend in a longitudinal direction, it may alternatively be envisioned that at least one rib of the housing and/or of the rotatable element may extend at least partly laterally or perimetrically along the relevant surface. Although preferably the rotatable element is rotatable relative to the housing, it could alternatively be envisioned that the rotatable element may be non-rotatable whilst the housing may be rotatable relative to the rotatable element instead. In a further modification, both the rotatable element and the housing may be rotatable, in preferably opposite directions to each other. The same direction of rotation may however be an option, preferably at different relative speeds to each other.

Whilst the rotatable element is or is substantially a polygon in a cross-section transverse to the chamber axis in the preferred embodiment, any non-polygonal cross-section may be an option, such as circular or substantially circular by way of example only.

Although the material-processing chamber, the interior surface, and the outer surface are preferably circular in cross-section transverse to the chamber axis, the material-processing chamber or at least one of the interior surface and outer surface may alternatively be or be substantially non-circular in a transverse cross-section, such as polygonal in cross-section. Although preferably extending at least in part into the material-processing chamber, in an alternative embodiment, the drive-unit compartment may be positioned or disposed solely within or solely outside of the material-processing chamber. Similarly, the drive-unit compartment may be positioned or disposed solely within or solely outside of the discharge outlet portion.

Whilst a preferred shape in transverse and/or longitudinal cross-sectional may have been specified for any of the above-described features, any of the above-described features may have any transverse and/or longitudinal cross-sectional shape, such as curved; non-curved; part-curved; a circle; an oval; an ovoid; linear; non-linear; a polygon, whether regular, irregular, chamfered or truncated, including a square, a rectangle, a trapezoid, a trapezium, a pentagon, a hexagon, a heptagon, an octagon, a decagon, a dodecagon, or any other polygon; or any abstract shape.

Furthermore, whilst there is preferably one apparatus per system, one housing, one discharge outlet portion, one rotatable portion, one grip-enhancing element per housing, one grip-enhancing element per rotatable element, one rotatable element, one drive unit, ten chamber-ribs, ten mixing-enhancing elements, ten rotatable element ribs, one cover mount, one drive-unit compartment, one drive-unit, the drive-unit compartment being dimensioned to receive only one drive unit at any one time, one scoop, one articulable-arm mounting element, and one double pin hitch; any alternative number of any of the above features or any other described feature may be provided, including none, one, or at least two.

It is therefore possible to provide an articulable-arm-mountable pulverisation apparatus with a unitary drive unit which can be axially extracted as a single enclosed unit from the material-receiving housing to allow the drive unit to be used in a different articulable-arm-mountable attachable apparatus. Having a common, removable drive unit saves space and reduces cost. The apparatus may be modularly assembleable for ease of replacement of individual parts and/or for selection of the size of the end product. By having a single, enclosed drive unit, the apparatus is more compact, which may reduce the material requirements during manufacture. As a result, the apparatus may be light enough to be removably mountable onto an excavating machine, which may already be onsite. More preferably, the apparatus may be usable with an excavating machine of fewer than 20 Tonnes. The articulable-arm-mountable pulverisation apparatus may even be provided without the drive unit such that it can be used on a demolition or building site where a suitable drive unit is already present. It is also possible to provide a system which includes an excavating machine and a plurality of different apparatuses, including a pulverisation apparatus. A common interface enables multiple different apparatuses, suited for different tasks, to be used with a single excavating machine, instead of requiring an individual, dedicated machine for each task. It is also possible to provide a method of pulverising material, whereby the pulverisation apparatus is mountable on an articulable arm. By being mountable onto an articulable-arm, the loading of material into the apparatus does not require any manual involvement. By pulverising material via shearing due to symmetric rotation of the rotatable element, the apparatus may break down materials with greater efficiency and/or to a more regular size.

The words 'comprises/comprising' and the words 'having/including' when used herein with reference to the present invention are used to specify the presence of stated features, integers, steps or components, but do not preclude the presence or addition of one or more other features, integers, steps, components or groups thereof. It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination. The embodiments described above are provided by way of examples only, and various other modifications will be apparent to persons skilled in the field without departing from the scope of the invention as defined herein.

The invention claimed is:

1. Articulable-arm-mountable pulverisation apparatus the apparatus comprising: a material-receiving housing having a material-processing chamber, a discharge outlet portion, and a drive-unit compartment; an articulable-arm mounting element; a rotatable element in the material-processing chamber and having a side surface which, together with an interior surface of the material-processing chamber, forms a tapering pulverising material flow-path towards the discharge outlet portion; and a unitary drive unit in the drive-unit compartment, the drive-unit compartment having an openable access cover, whereby opening the openable access cover, the unitary drive unit can be slidably removed in an axial direction as one-piece from the drive-unit compartment.

2. Articulable-arm-mountable pulverisation apparatus as claimed in claim 1, wherein the drive-unit compartment extends at least in part into the material-processing chamber.

3. Articulable-arm-mountable pulverisation apparatus as claimed in claim 1, wherein the drive-unit compartment is closable or substantially closable by the rotatable element.

4. Articulable-arm-mountable pulverisation apparatus as claimed in claim 1, wherein the drive-unit compartment extends at least in part into or through the discharge outlet portion.

5. Articulable-arm-mountable pulverisation apparatus as claimed in claim 1, wherein the drive-unit compartment extends axially outside of the material-processing chamber and/or outside of the discharge outlet portion.

6. Articulable-arm-mountable pulverisation apparatus as claimed in claim 1, wherein the material-processing chamber has a chamber axis and the rotatable element has a rotatable-element axis of rotation which is or is substantially coaxial with a chamber axis of the material-processing chamber.

7. Articulable-arm-mountable pulverisation apparatus as claimed in claim 1, wherein the rotatable element is at least one of: tapered and a frustum.

8. Articulable-arm-mountable pulverisation apparatus as claimed in claim 1, wherein the rotatable element and/or the material-processing chamber is or is substantially a polygon in a transverse cross-section.

9. Articulable-arm-mountable pulverisation apparatus as claimed in claim 8, wherein the polygon is a decagon.

10. Articulable-arm-mountable pulverisation apparatus as claimed in claim 1, wherein the rotatable element is or is substantially circular in a transverse cross-section.

11. Articulable-arm-mountable pulverisation apparatus as claimed in claim 1, wherein the material-processing chamber is or is substantially cylindrical.

12. Articulable-arm-mountable pulverisation apparatus as claimed in claim 1, wherein the material-processing chamber further comprises a grip-enhancing element and/or the rotatable element comprises a further grip-enhancing element.

13. Articulable-arm-mountable pulverisation apparatus as claimed in claim 1, further comprising at least one mixing enhancing element, extending radially from the or an interior surface of the material-processing chamber.

14. Articulable-arm-mountable pulverisation apparatus as claimed in claim 13, wherein the at least one mixing-enhancing element is or is substantially a trapezium in axial cross-section.

15. Articulable-arm-mountable pulverisation apparatus as claimed in claim 1, further comprising a further said rotatable element, interchangeable with the first said rotatable element.

16. Articulable-arm-mountable pulverisation apparatus as claimed in claim 15, wherein the further said rotatable element has a different dimension to the first said rotatable element.

17. Articulable-arm-mountable pulverisation apparatus as claimed in claim 1, further comprising a scoop element.

18. A system comprising an excavating machine and a pulverisation apparatus as claimed in claim 1.

19. A system as claimed in claim 18, comprising a plurality of attachable apparatuses, at least one of which is the said pulverisation apparatus, wherein the drive unit is usable with another of the plurality of attachable apparatuses.

20. A method of pulverising material, the method comprising the steps of: a] providing an excavating machine and a pulverisation apparatus as claimed in claim 1; b] mounting the pulverisation apparatus onto an articulable arm of the excavating machine; c] rotating the rotatable element relative to the material-receiving housing and inserting material to be pulverised into the material-receiving housing, such that the material is broken down by shearing caused by the rotation of the rotatable element-relative to the material-receiving housing and/or vice-versa.

* * * * *